United States Patent [19]

Epple

[11] 4,032,045
[45] June 28, 1977

[54] SOUP DISPENSER

[75] Inventor: Richard R. Epple, Glen Burnie, Md.

[73] Assignee: Maryland Cup Corporation, Owings Mills, Md.

[22] Filed: June 20, 1975

[21] Appl. No.: 588,903

[52] U.S. Cl. .................. 222/146 HE; 222/368; 259/44

[51] Int. Cl.² ................ B67D 5/62; G01F 11/22

[58] Field of Search .............. 222/146 HE, 368; 219/214, 310–316, 327–331, 335, 297, 436; 259/44; 99/348

[56] References Cited

UNITED STATES PATENTS

| 2,569,257 | 9/1951 | Parker | 222/368 X |
| 3,178,557 | 4/1965 | Umann | 222/146 HE X |
| 3,266,673 | 8/1966 | Sessions | 219/316 X |
| 3,278,092 | 10/1966 | Kletschke et al. | 222/368 |
| 3,878,360 | 4/1975 | Augustine et al. | 222/146 HE X |

Primary Examiner—Stanley H. Tollberg
Assistant Examiner—John P. Shannon
Attorney, Agent, or Firm—Birch, Stewart, Kolasch & Birch

[57] ABSTRACT

A soup dispenser is provided with a simplified but accurate volumetric trap valve and reservoir assembly that obviates the need for venting in the dispensing of hot soup and the like with or without a high solids content. The entire unit including the valve, the reservoir and motorized impeller device for maintaining soup in the reservoir in a homogeneous condition is readily disassembled for cleaning and sanitizing.

17 Claims, 14 Drawing Figures

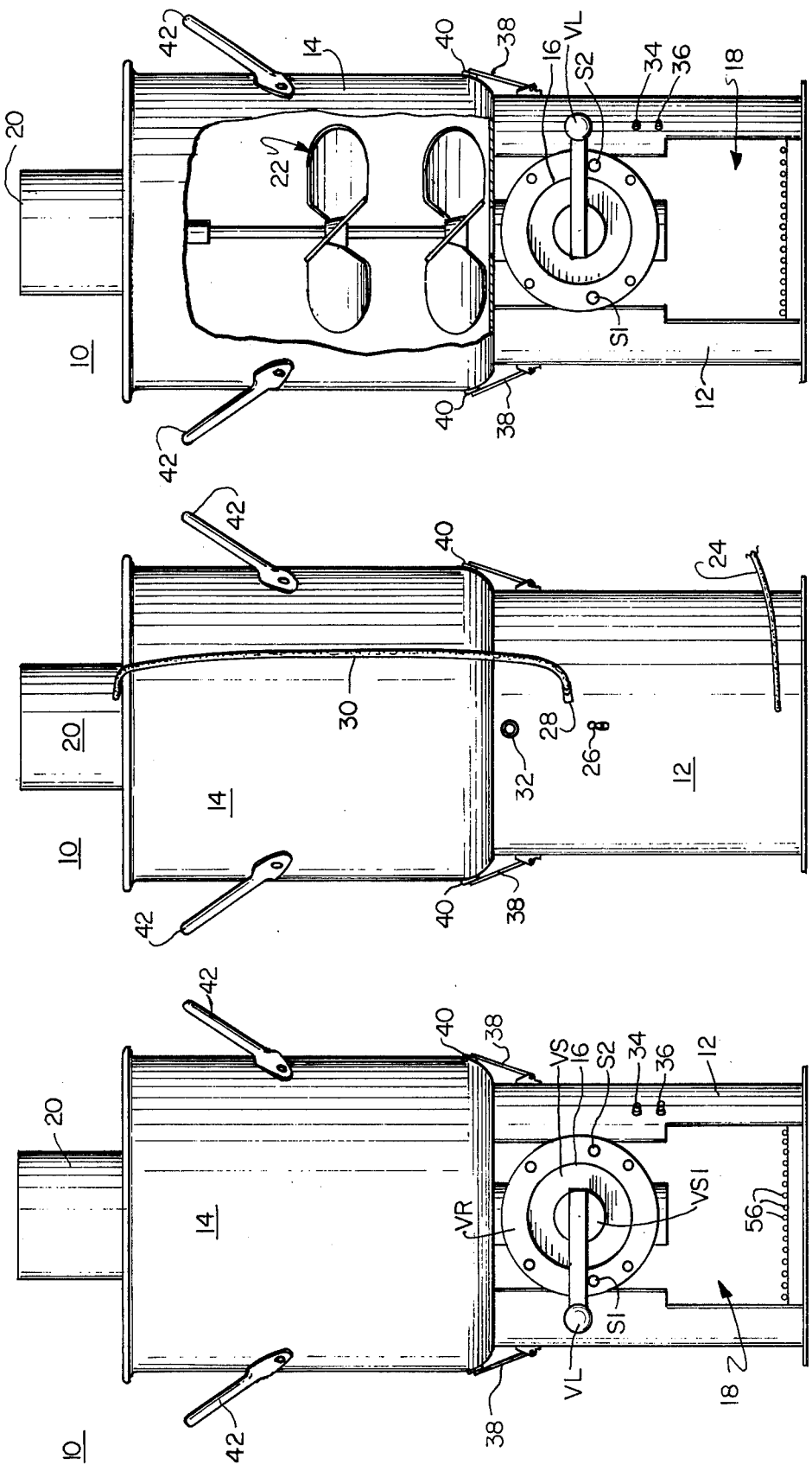

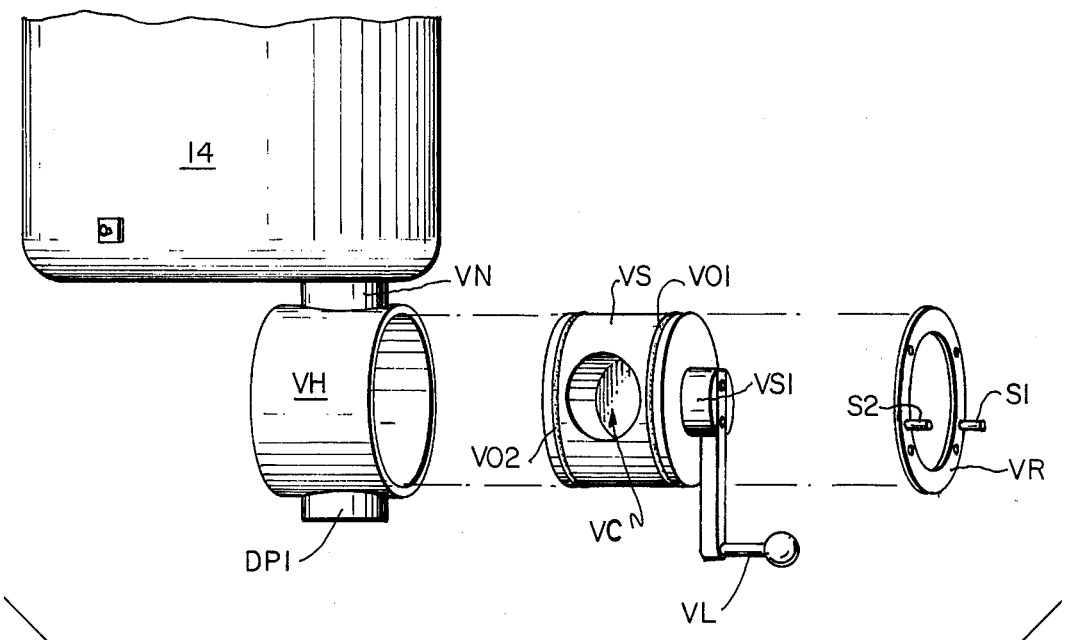
FIG. 8
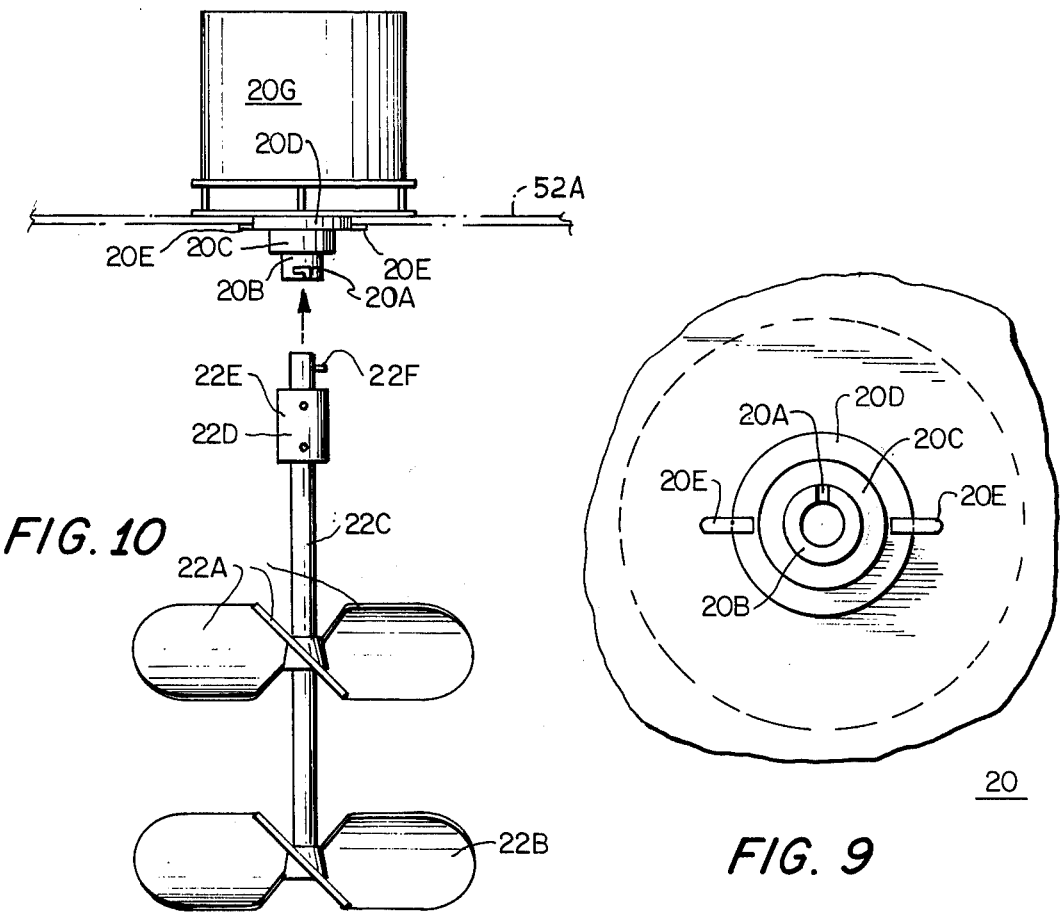
FIG. 10
FIG. 9

SOUP DISPENSER

NATURE OF THE INVENTION

This invention relates to devices for dispensing predetermined unit volumes of liquids and more particularly to volumetric dispensers for hot soups and the like including soups with substantial and/or chunky solids content.

BACKGROUND OF THE INVENTION

In the volumetric dispensing of heated fluids such as soups, it has been common practice to use vented trap valves to dispense metered quantities of the soup. The use of such vents has been essential to insure that reasonably accurate and reliable unit volumes of soup or the like are dispensed for each actuation of the trap valves. When chunky and/or high solids content soups are to be dispensed, however, the vents tend to clog, resulting in improper and unreliable operation and/or unsanitary conditions due to the difficulty of properly cleaning and sterilizing the vent passages. Prior art attempts to handle chunky or high solids content soups have resorted to relatively ungainly and cumbersome trap valve structures.

Thus, there is a long felt need in the art for soup dispensers which can be readily cleaned to maintain high sanitary requirements; which obviate the need for venting the trap valves; and which include volumetric trap valves of simplistic construction coupled with accurate and reliable operation.

OBJECTS OF THE INVENTION

It is an object of the present invention to provide a new and novel hot soup dispenser capable of handling both high and low solid content soups with equal facility.

Another object of the present invention is to provide a new and novel hot soup dispenser capable of handling both high and low solid content soups with equal facility and which includes a new and novel volumetric trap valve which obviates the need for venting the trap chamber in order to obtain reasonably accurate and reliable operation.

Still another object of the present invention is to provide a new and novel soup dispenser structure which is easily disassembled for cleaning purposes to provide a highly unsanitary soup dispensing structure.

Yet another object of the present invention is to provide a new and novel volumetric trap valve of optimum simplicity and reliability for use in soup dispensers and the like.

These and other objects of the present invention will become more fully apparent with reference to the following specification and drawings which relate to a preferred embodiment of the invention.

SUMMARY OF THE INVENTION

The soup dispenser of the present invention includes a soup reservoir having an electric motor removably and positively mounted on the exterior of the reservoir lid with a dependent shaft extending downward into the reservoir to a point adjacent the bottom of the latter. Impeller blades are mounted on the shaft with an angle of attack designed to act in cooperation with the direction of rotation of the shaft to impel heavier solids in the soup to be dispensed upward and outward from the lowermost center of the reservoir. This achieves a substantially homogeneous suspension of solids in the soup to be dispensed.

The motor is quickly coupled into the top of the reservoir in such a manner that the motor torque tends to tighten the coupling and preclude accidental disengagement thereof. In addition quick coupling means are provided in the impeller shaft to permit the major portion of the shaft and the impeller to be removed from the motor-impeller assembly for cleaning.

The reservoir is mounted in a base stand which includes a heating unit that is controlled by conventional thermostat means to heat the soup in the reservoir to a desired temperature. Suitable "heating" and "serving temperature" indicator lights are also provided to provide a visual indication of the state of the soup to be dispensed.

In the lower end of the reservoir, there is provided a relatively large outlet port such that food particles or chunks of relatively large dimension will pass therethrough.

Positioned beneath the reservoir outlet port and mounted on the said reservoir is a valve cylinder, suitably journalled for rotation, with its axis of revolution positioned across the center of the said outlet port. A cylindrical trap chamber of substantially identical dimension to the outlet port is formed in the valve cylinder orthogonal to the axis of revolution of the latter such that its fully closed nondispensing position, the outlet port is coincident with the open end of said cylindrical trap chamber. This substantially identical transverse dimensioning of outlet port and trap chamber preclude vapor lock and obviate the need for venting the trap chamber.

The outlet port and trap chamber both being of circular cross-section, provide a scissors action to cut or shear any solids or chunks in the soup when the trap valve cylinder is rotated 180° to effect a discharge of the volume of soup in the trap chamber. A cylindrical dispensing port in the trap valve housing is provided opposite the reservoir outlet port such that the trap chamber will progressively align with that port as the valve cylinder is rotated to the dispensing position to preclude sudden dumping and splashing of the soup being dispensed.

BRIEF DESCRIPTION OF THE DRAWINGS

FIG. 1 is a front view of the soup dispenser of the present invention;

FIG. 2 is a rear view of the soup dispenser of the present invention;

FIG. 3 is a broken away view showing the impeller and impeller motor assembly mounted in the reservoir;

FIG. 8 is an exploded view in perspective of the dispensing valve assembly of the present invention;

FIG. 9 is a bottom end view of the impeller motor assembly of the present invention;

FIG. 10 is a side elevation of the impeller motor assembly of the present invention;

DETAILED DESCRIPTION OF THE INVENTION

Figure 4:
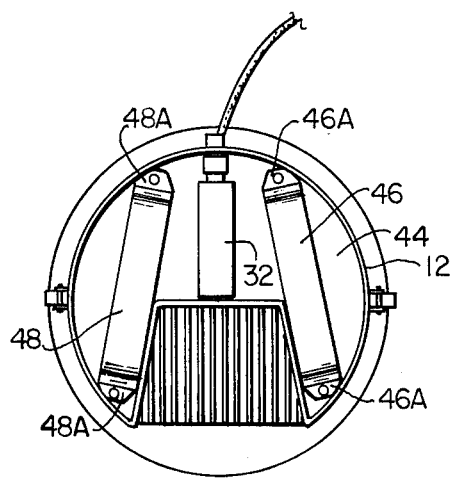
FIG. 4 is a top plan view of the base stand of the present invention with the reservoir assembly removed.

Referring in detail to the drawings and with particular reference to FIGS. 1, 2 and 3, the soup dispenser 10 of the present invention is shown as including a base stand 12, a reservoir 14 mounted on the base 12, a dispensing valve assembly 16 integrally mounted on the lower portion of the reservoir within a dispensing chamber 18 in the base 12 and a top mounted impeller motor assembly 20 and detachable impeller 22 (FIG. 3) suspended from the impeller motor assembly inside the reservoir 14.

As shown in FIG. 2, the soup dispenser 10 includes an input power cord 24; an on-off switch 26; a power receptacle 28 coupled to the impeller motor assembly 20 by a plug-in cord 30; and a thermostatic control 32.

On the right front side of the soup dispenser 10, as shown in FIGS. 1 and 3 are a "heating" indicator lamp 34 and a "serving temperature" indicator lamp 36 which indicate the state of soup contained in the reservoir 14.

Suitable clamping means 38 are provided on the sides of the base 12 to engage with conventional clamping ears 40 on the reservoir 14 to removably secure the reservoir 14 and dispensing valve assembly 16 on the base stand 12.

Suitable handles 42 are formed on the reservoir 14 for facility in handling the latter when the soup dispenser 10 is disassembled.

Figure 13:
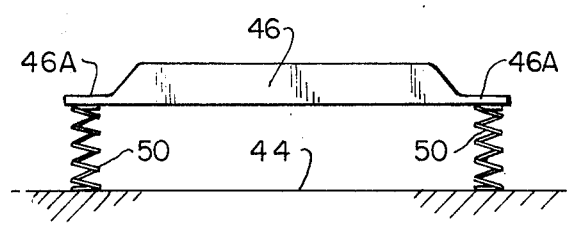
FIG. 13 is a schematic of a heater detail of the present invention.

Referring additionally to FIGS. 4 and 13, it can be seen that beneath the reservoir 14 on a mounting ledge 44 formed in the base stand 12 are first and second heater bars 46 and 48, conventionally energized through the thermostatic control 32 which is also mounted on the ledge 44. The ends 46A, 48A of the respective heater bars 46, 48 are biased upward from the ledge 44 by means of compression spring 50 (schematically illustrated in FIG. 13 on a heater bar 46) such that the heater bars 46, 48 will be biased into juxtaposition with the outer bottom wall of the reservoir 14 to maximize heat transfer to soup contained in the latter.

Figure 5:
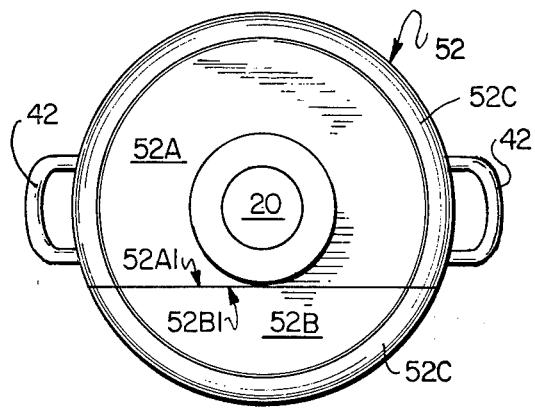
FIG. 5 is a top plan view of the soup dispenser of the present invention.

The top of the soup dispenser 10 is shown in FIG. 5 with the impeller motor assembly mounted in a major section 52A of a circular split lid 52, a minor section 52B of the lid 52 being removable for observing and/or refilling the contents of the reservoir 14.

Figure 11:
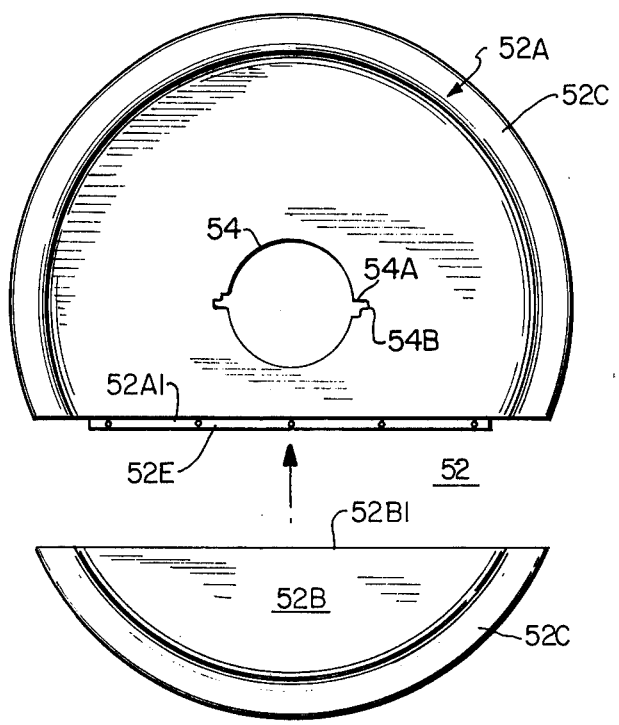
FIG. 11 is an exploded top plan view of the lid assembly for the reservoir of the present invention.
Figure 12:
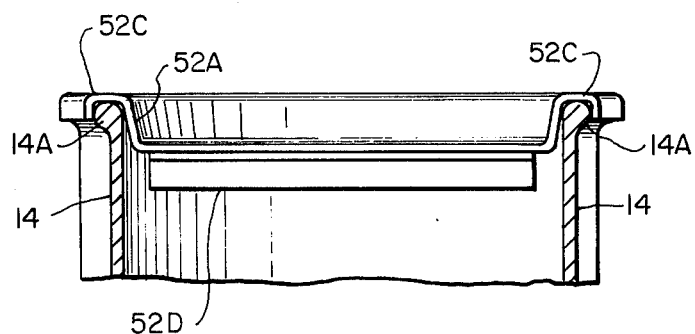
FIG. 12 is a side elevation of a lid assembly detail.

The split lid 52 is shown in more detail in FIGS. 11 and 12 and includes a mounting port 54 formed therein with locking tab receiving slots 54A with locking abutments or bosses 54B immediately adjacent thereto to conformally receive locking means on the bottom of the impeller motor assembly 20 as will be more fully described with reference to FIGS. 9, 10 and 11.

The sections 52A and 52B of the split lid 52 have inverted U-shaped flanges 52C which fit conformally over a top peripheral rim 14A on the reservoir 14 to hold the lid 52 and impeller motor assembly 20 in position on the reservoir 14.

The lid sections 52A and 52B have abutting edges 52A1, 52B1 cut on the same cord of the split lid 52 and the major portion 52A is reinforced along the edge 52A1 by a substantially coterminate angle bar 52D welded thereto. The angle bar 52D has a flange portion 52E which extends outward of the edge 52A1 and beneath the adjacent edge 52B1 of the minor section 52B to provide a more stable lid structure and to preclude foreign matter from entering the soup reservoir 14.

Figure 6:
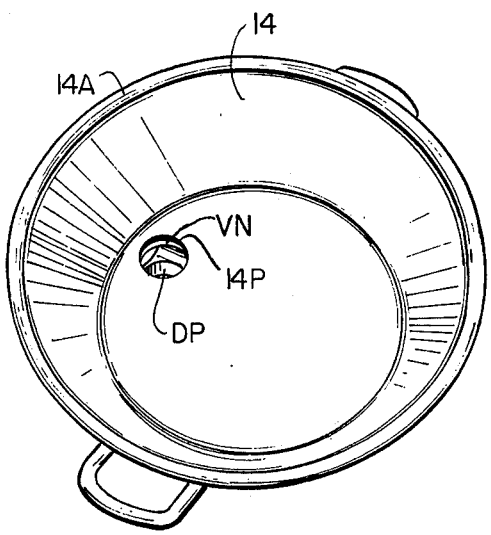
FIG. 6 is a top plan view of the reservoir with the impeller, impeller motor and cover removed.
Figure 7:
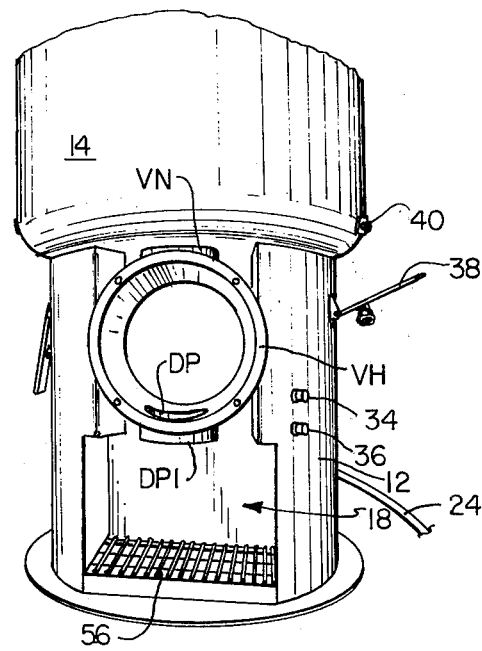
FIG. 7 is a detailed perspective of the dispensing valve housing on the reservoir assembly and the base stand with the valve spool removed.

Referring to FIGS. 6, 7 and 8, the dispensing valve assembly 18 and its cooperation with the reservoir 14 will now be described.

The reservoir 14 is provided with an outlet port 14P in the bottom thereof which is substantially identical in diameter to a cylindrical trap chamber VC in the valve spool VS of the valve assembly 18. The valve housing VH of the assembly 18 is integrally affixed, such as by brazing, to the bottom outer surface of the reservoir 14 in the provision of a short hollow cylindrical neck portion VN the inner bore of which is an extension of the outlet port 14P in the reservoir 14, thereby providing communication between the latter and the interior of the valve housing VH. Diametrically opposed to the outlet port 14P in the valve housing VH is a dispensing port DP of similar diameter which is extended outwardly of the valve housing VH by a short cylindrical outlet extension or dispenser nozzle DP1.

The valve spool VS is formed of molded nylon or the like and is journalled for rotation in the valve housing VH, sealed therein by end-mounted O-rings VO1 and VO2 and retained therein by a removable retaining ring VR suitably bolted to the valve housing VH. As illustrated in FIG. 8, the valve housing VH is internally dimensioned to closely and telescopically receive the valve spool VS with the O-rings VO1 and VO2 thereon.

The valve trap chamber VC is a cylindrical bore having its longitudinal axis perpendicular to the axis of rotation of the valve spool VS such that a rotation of 180° of the valve spool VS will result in alternate registry of the trap chamber VC with the outlet port 14P of the reservoir 14 and the dispensing port DP in the valve housing VH.

The valve spool VS is rotated between its fill and dispense positions by means of a radially disposed crank lever VL which is bolted or otherwise affixed across the face of an extended coaxial cranking hub VS1 on the valve spool VS.

The retaining ring VR for the valve spool VS has two limit stops S1 and S2 protruding therefrom in a horizontal plane just below the center of the valve spool VS. These limit stops S1 and S2 engage the crank lever VL in its two extreme positons, namely, fill and dispense, respectively.

The diameter of the cylindrical trap chamber VC in the valve spool VS is substantially identical to that of the outlet port 14P in the reservoir 14 and in the fill position of the valve spool VS (FIG. 1) the said trap chamber VC and outlet port 14P are in registry. The same relative identity of dimensions exists between the trap chamber VC and the dispensing spout DP1 such that in the discharge position of the valve spool VS (crank VL rotated clockwise against the second limit stop S2 as shown in FIG. 3) the said trap chamber VC is in registry with the discharge port DP and discharge spout DP1.

The combined structure of the trap chamber VC and outlet port 14P and the latter's dependent extension VN precludes the entrapment of air or steam from hot soup and therefore obviates the need for venting the trap chamber VC since reliable and accurate metering of soup is effected without venting.

Figure 14:
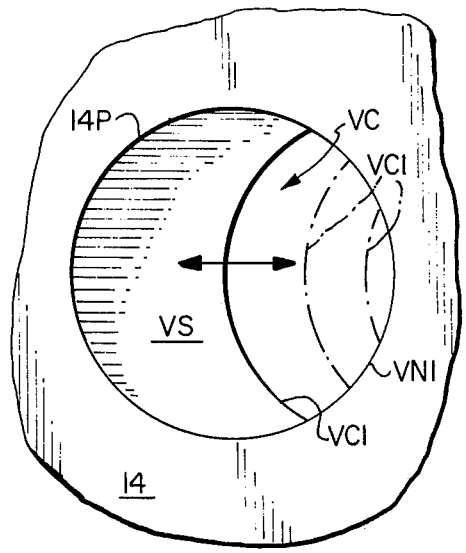
FIG. 14 is a detailed showing of the cutting action achieved in the outlet port in the reservoir and the trap chamber of the dispensing valve.

In addition, with reference to FIG. 14 since the registry between the trap chamber VC and outlet port 14P progressively changes prior to discharge of the trap chamber VC in the dispensing mode of actuation thereof, the peripheral edges VC1 and of the trap chamber VC and outlet port extension VN provide a shearing action on soup solids, thereby enhancing the ease of operation and the volumetric accuracy of the soup dispenser 10.

The progressive registry of the trap chamber VC and dispensing port DP provide a gradual and progressive dumping of the contents of the trap chamber VC through the outlet spout DP1 into a receptacle positioned beneath the latter on the drain grid 56 in the cavity 18 (FIGS. 1, 3 and 7) which minimizes splashing of the dispensed contents.

The simplistic structure and operation of the trap chamber VC, outlet port 14P and dispensing port DP provides a ready vehicle for dispensing chunky foods. The diameters of these elements are merely varied to pass and receive the maximum size of chunks or solids to be encountered such that thick soups, stews and the like are as readily and accurately dispensed as broths and purees.

In the overall operation, the impeller motor assembly 20 and impeller 22 play an important role in that they maintain the soup in a homogeneous state and are readily disassembled for cleaning and sanitizing.

As shown in FIGS. 3, 9 and 10, the twin impellers 22A and 22B are spaced apart on a common shaft 22C with the impeller 22B immediately adjacent the bottom of the reservoir 14 and the said impellers having a pitch designed to lift soup solids upward in the reservoir to preclude settling and thereby rendering the soup homogeneous.

The shaft 22C terminates in a concentric sleeve 22D which mounts a coaxial stub shaft 22E and bayonet coupling pin 22F which, in turn, fits into a female bayonet coupling 20A in the outer end of the output shaft 20B of the impeller motor assembly 20.

The motor assembly 20 includes a molded nylon bushing 20C for the output shaft 20B, the said bushing extending upward into a mounting ring 20D in which are mounted a pair of diametrically opposed and undercut locking tabs 20E.

The tabs 20E are beneath a motor support plate 20F which rests on top of the major portion 52A of the split lid 52 while the mounting ring 20D and locking tabs 20E pass through the mounting port 54 and locking tab receiving slots 54A, respectively, to a position beneath the said lid 52.

The support plate 20F and motor housing 20G thereabove are then twisted until the locking tabs engage the locking bosses 54B in which position the direction of rotation of the output shaft 20B and the reaction torque of the impeller assembly 22 act to maintain the locking tabs 20E juxtaposed with the locking bosses 54B to maintain the motor assembly 20 locked in place during operation of the soup dispenser 10.

The valve spool VS of the present invention is preferably made of molded nylon or the like and the other major elements of the dispenser 10, particularly those contacting or exposed to contact with the soup being dispensed, are preferably made of stainless steel.

The present invention may be modified as would occur to one of ordinary skill in the art without departing from the spirit and scope of the present invention.

I claim:

1. A dispensing apparatus for hot soup and the like comprising:
    a base stand;
    heating and control means housed in said base stand for supplying controlled heat;
    a reservoir and integral dispensing valve assembly mounted on said base stand with the lower end of said reservoir in immediate proximity to said heating means;
    said base stand having a generally cylindrical configuration interrupted by inwardly extending vertical walls defining a vertical dispensing chamber for receiving receptacles to be filled;
    said dispensing chamber freely receiving said dispensing valve assembly;
    said dispensing valve assembly including a discharge spout positioned in the upper portion of said dispensing chamber;
    said reservoir having an open top;
    split lid means closing said reservoir and comprising a major section and a minor section; and
    motor driven rotary impeller means removably mounted in said major section of said split lid means;
    said impeller means extending into close proximity with the bottom of said reservoir and imparting upward thrust to soup and solid particles entrained therein when said reservoir contains soup to be dispensed to preclude settling of solid particles in said reservoir; and
    said minor section of said lid means being freely removable independently of said major portion to provide access to said reservoir without removing said impeller means;
    wherein said base stand includes an internal shelf positioned adjacent the top thereof and the bottom of said reservoir; and
    wherein said heating and control means comprises: at least one heating element mounted on said shelf,
    biasing means mounting said heating element on said shelf and constraining said heating element into positive engagement with the bottom of said reservoir, and
    thermostat means for controlling said heating element and the temperature of said reservoir mounted adjacent the latter on said shelf and in close proximity to the bottom of said reservoir.

2. The invention defined in claim 1, wherein said thermostat means includes a pair of said heating elements each being generally bar shaped and said biasing means comprises spring means extending from the ends of said elements to said shelf; and
    said thermostat means is positioned between said pair of heating elements.

3. A dispensing apparatus for hot soup and the like comprising:
    a base stand;
    a heating and control means housed in said base stand for supplying controlled heat;
    a reservoir and integral dispensing valve assembly mounted on said base stand with the lower end of said reservoir in immediate proximity to said heating means;

said base stand having a generally cylindrical configuration interrupted by inwardly extending vertical walls defining a vertical dispensing chamber for receiving receptacles to be filled;

said dispensing chamber freely receiving said dispensing valve assembly;

said dispensing valve assembly including a discharge spout positioned in the upper portion of said dispensing chamber;

said reservoir having an open top;

split lid means closing said reservoir and comprising a major section and a minor section; and motor driven rotary impeller means removably mounted in said major section of said split lid means;

said impeller means extending into close proximity with the bottom of said reservoir and imparting upward thrust to soup and solid particles entrained therein when said reservoir contains soup to be dispensed to preclude settling of solid particles in said reservoir; and said minor section of said lid means being freely removable independently of said major portion to provide access to said reservoir without removing said impeller means;

wherein said reservoir and integral dispensing valve assembly includes:

an outlet port defined in the bottom of said reservoir, said outlet port being positioned over said dispensing chamber in said base stand and an integral dependent hollow neck portion of substantially identical internal diameter as said outlet port extending downward from said reservoir into said dispensing chamber;

a cylindrical valve housing integral with said neck portion and having an inlet port defined in the upper periphery thereof at the lower end of said neck portion of substantially identical diameter to said outlet port and in registry therewith;

a cylindrical valve spool journalled for rotation in said housing between a fill position and a dispense position, said valve spool having a cylindrical trap chamber formed therein having a longitudinal axis transverse of the longitudinal axis of the valve spool and an intake end in registry with said inlet port in said fill position and of substantially identical diameter as said inlet and outlet ports;

a dispensing port formed in said valve housing in diametric opposition to said inlet and outlet ports in registry with said trap chamber intake end in said dispense position of said valve spool and having a substantially identical internal diameter as said inlet and outlet ports and said trap chamber intake end;

a radially disposed valve actuating lever on said valve spool;

keeper means retaining said valve spool in said valve housing; and limit stop means on said keeper means engaging said actuating lever at said fill and dispense positions thereof to insure full registry of said trap chamber with said inlet, outlet and dispensing ports.

4. The invention defined in claim 3 wherein said intake end of said trap chamber and said inlet port in said valve housing are defined by circular edge surfaces cooperating to provide a shearing action when said valve spool is rotated from said fill position toward said dispense position.

5. The invention defined in claim 3, wherein said base stand includes an internal shelf positioned adjacent the top thereof and the bottom of said reservoir; and wherein said heating and control means comprises at least one heating element mounted on said shelf;

biasing means mounting said heating elements on said shelf and constraining said heating element into positive engagement with the bottom of said reservoir, and thermostat means for controlling said heating element and the temperature of said reservoir mounted adjacent the latter on said shelf and in close proximity to the bottom of said reservoir.

6. The invention defined in claim 5, wherein said thermostat means includes a pair of said heating elements each being generally bar shaped and said biasing means comprises spring means extending from the ends of said elements to said shelf; and said thermostat means is positioned between said pair of heating elements.

7. the invention defined in claim 5, wherein said intake end of said trap chamber and said inlet port in said valve housing are defined by circular edge surfaces cooperating to provide a shearing action when said valve spool is rotated from said fill position toward said dispense position.

8. The invention defined in claim 7, wherein said thermostat means includes a pair of said heating elements each being generally bar shaped and said biasing means comprises spring means extending from the ends of said elements to said shelf; and said thermostat means is positioned between said pair of heating elements.

9. A dispensing apparatus for hot soup and the like comprising:

a base stand;

heating and control means housed in said base stand for supplying controlled heat;

a reservoir and integral dispensing valve assembly mounted on said base stand with the lower end of said reservoir in immediate proximity to said heating means;

said base stand having a generally cylindrical configuration interrupted by inwardly extending vertical walls defining a vertical dispensing chamber for receiving receptacles to be filled;

said dispensing chamber freely receiving said dispensing valve assembly;

said dispensing valve assembly includng a discharge spout positioned in the upper portion of said dispensing chamber;

said reservoir having an open top;

split lid means closing said reservoir and comprising a major section and minor section; and motor driven rotary impeller means removably mounted in said major section of said split lid means;

said impeller means extending into close proximity with the bottom of said reservoir and imparting upward thrust to soup and solid particles entrained therein when said reservoir contains soup to be dispensed to preclude settling of solid particles in said reservoir; and said minor section of said lid means being freely removable independently of said major portion to provide access to said reservoir without removing said impeller means;

wherein said motor driven impeller means includes:
a drive motor having a housing and a base plate, a latch plate having radially extending locking tabs thereon beneath said base plate and an output shaft having first coupling means thereon extending beneath said base plate; and
an impeller assembly including an impeller shaft, at least one impeller means on said shaft comprising a multiplicity of radially disposed blades on said shaft adjacent the said bottom of said reservoir, and a second coupling means at one end of said shaft detachably and coaxially coupling said impeller shaft with said output shaft; and
wherein said major section of said split lid means includes a mounting port defined therein with first relieved edge portions conformally shaped to pass said latch plate and locking tabs therethrough and second relieved edge portions to engage with said locking tabs to releasably retain said motor on said lid means, said second relieved edge portions and said locking tabs maintaining said latched condition in response to the torque of said motor driven impeller means.

10. The invention defined in claim 9, wherein said base stand includes an internal shelf positioned adjacent the top thereof and the botton of said reservoir; and
wherein said heating and control means comprises at least one heating element mounted on said shelf;
biasing means mounting said heating elements on said shelf and constraining said heat element into positive engagement with the bottom of said reservoir, and
thermostat means for controlling said heating element and the temperature of said reservoir mounted adjacent the latter on said shelf and in close proximity to the bottom of said reservoir.

11. The invention defined in claim 10, wherein said thermostat means includes a pair of said heating elements each being generally bar shaped and said biasing means comprises spring means extending from the ends of said elements to said shelf; and
said thermostat means is positioned between said pair of heating elements.

12. The invention defined in claim 3, wherein said motor driven impeller means includes:
a drive motor having a housing and a base plate, a latch plate having radially extending locking tabs thereon beneath said base plate and an output shaft having first coupling means thereon extending beneath said base plate; amd
an impeller assembly including an impeller shaft, at least one impeller means on said shaft comprising a multiplicity of radially disposed blades on said shaft adjacent the said bottom of said reservoir, and a second coupling means at one end of said shaft detachably and coaxially coupling said impeller shaft with said output shaft; and
wherein said major section of said split lid means includes a mounting port defined therein with first relieved edge portions conformally shaped to pass said latch plate and locking tabs therethrough and second relieved edge portions to engage with said locking tabs to releasably retain said motor on said lid means, said second relieved edge portions and said locking tabs maintaining said latched condition in response to the torque of said motor driven impeller means.

13. The invention defined in claim 12, wherein said intake end of said trap chamber and said intake port in said valve housing are defined by circular edge surfaces cooperating to provide a shearing action when said valve spool is rotated from said fill position toward said dispense position.

14. The invention defined in claim 12, wherein said base stand includes an internal shelf positioned adjacent the top thereof and the bottom of said reservoir; and
wherein said heating and control means comprises at least one heating element mounted on said shelf;
biasing means mounting said heating elements on said shelf and constraining said heating element into positive engagement with the bottom of said reservoir, and
thermostat means for controlling said heating element and the temperature of said reservoir mounted adjacent the latter on said shelf and in close proximity to the bottom of said reservoir.

15. The invention defined in claim 14, wherein said thermostat means includes a pair of said heating elements each being generally bar shaped and said biasing means comprises spring means extending from the ends of said elements to said shelf; and
said thermostat means is positioned between said pair of heating elements.

16. The invention defined in claim 14, wherein said intake end of said trap chamber and said intake port in said valve housing are defined by circular edge surfaces cooperating to provide a shearing action when said valve spool is rotated from said fill position toward said dispense position.

17. The invention defined in claim 15, wherein said intake end of said trap chamber and said intake port in said valve housing are defined by circular edge surfaces cooperating to provide a shearing action when said valve spool is rotated from said fill position toward said dispense position.

* * * * *